United States Patent [19]
Buzbee

[11] Patent Number: 5,838,810
[45] Date of Patent: Nov. 17, 1998

[54] METHOD AND SYSTEM OF DETECTING PROFILE MATURATION USING IMAGE PROCESSING TECHNIQUES

[75] Inventor: William B. Buzbee, Half Moon Bay, Calif.

[73] Assignee: Hewlett-Packard Company, Palo Alto, Calif.

[21] Appl. No.: 728,452

[22] Filed: Oct. 10, 1996

[51] Int. Cl.$^6$ ....................................................... G06L 9/00
[52] U.S. Cl. ........................... 382/100; 395/680; 395/855; 395/200.03
[58] Field of Search .................................... 382/100, 236, 382/680, 218; 348/161; 395/680, 855, 200.03

[56] References Cited

U.S. PATENT DOCUMENTS

| | | | |
|---|---|---|---|
| 4,441,165 | 4/1984 | Coleman et al. | 382/218 |
| 4,538,149 | 8/1985 | Wehner | 343/17.2 R |

Primary Examiner—Andrew W. Johns
Assistant Examiner—Hieu C. Le

[57] ABSTRACT

A method and system of controlling the frequency and duration of bursts made by a burst profiler profiling an application in a computer system. A burst profiler profiles the application by running the application free and unfettered for a first time period. Then, the profiler instruments the application with instructions that produce profile information and runs the instrumented application for a second time period. This process repeats as necessary and generates bursts of profile data. The profiler converts the bursts of profile data into images. This conversion is performed by mapping each attribute of the profile data to an image attribute. Next, an image processing subsystem within the computer system compares an image with an image generated from a previous burst. This image processing subsystem preferably implements the MPEG standard. From the information gathered by comparing the two images, the profiler can adjust the frequency and duration of the bursts to account for profile stabilization.

20 Claims, 2 Drawing Sheets

METHOD AND SYSTEM OF DETECTING PROFILE MATURATION USING IMAGE PROCESSING TECHNIQUES

RELATED APPLICATION

This application is related to Ser. No. 08/719,854, entitled METHOD AND SYSTEM OF BURST PROFILING USING DYNAMIC RECOMPILATION, filed Sep. 30, 1996, and hereby incorporated by reference herein. This application is commonly assigned.

TECHNICAL FIELD OF THE INVENTION

This invention pertains generally to application profiling and particularly to identifying when a profile has stabilized.

BACKGROUND OF THE INVENTION

Burst profiling is performed by running an application free and unfettered for a first time period. Then, instrumenting the application with profiling code that generates profile data and running it for a second time period. Next, the application is again run free and unfettered. This process is repeated until either the application finishes execution or enough profile data has been collected. Burst profiling is discussed in more detail in copending application Ser. No. 719854, entitled METHOD AND SYSTEM OF BURST PROFILING USING DYNAMIC RECOMPILATION, which is hereby incorporated by reference.

One important issue when burst profiling is determining when to stop. That is, determining when enough profile data has been collected to paint an accurate picture of the profiled application. In the past, statistical techniques were used to determine when enough data had been collected.

However, statistical techniques often did not account for variations among different types of programs. Numerical analysis programs, for example, execute some initialization code and then spend most of the time executing a few long loops. The profiles of such programs do not change much over time. Therefore, only a few short bursts of data are necessary to create an accurate profile of the program. Other programs, such as a chess program, might have different behavior at the beginning, middle, and end of a game. Accordingly, a profiler needs to execute a majority of the program in order to gather an accurate profile.

A profiling technique that overcomes the disadvantages of the prior art statistical techniques is to measure the differences between bursts. When the differences become small, the profile is stabilizing and the profiler can either stop profiling or stretch out the time between bursts. For example, when the profiler is performing a profile burst every ½0th of a second and the changes between the profiles get relatively small, the profiler can reduce the profiler bursts to only twice or once a second.

It is difficult, however, to analyze the profile data in the brief period between the bursts. Each burst may contain large amounts of information. Conventional comparison techniques, therefore, may not be fast or efficient enough to compare all of the bursts' data in the allotted time period.

Accordingly, there is a need in the art for a way to determine when an application's profile is stabilizing.

There is also a need in the art for a way to determine when enough burst samples have been collected to accurately profile an application.

There is also a need in the art for a way to quickly and efficiently determine the differences between two or more burst data sets.

SUMMARY OF THE INVENTION

The above and other needs are met by a method and system that casts profile data as image data and then uses commonly available image processing technology to compare the data. A burst profiler profiles an application and produces sequential sets of profile data. Each set of data is recast as an image. For example, if the profiler is collecting data on the number of times branches are taken, then each branch can be mapped to an X-Y coordinate of an image. The size of a dot centered at the X-Y coordinate can represent the number of times the branch was encountered. In addition, the color of the dot can represent the degree to which the branch was taken.

Then, image comparison techniques are used to compare the image with another image generated from previously gathered profile data. Due to the rise in demand for multimedia computer systems, significant advances have been made in image processing algorithms and hardware. One such advance is the Moving Pictures Experts Group (MPEG) standard. MPEG was originally designed to conserve bandwidth while transmitting frames of digital video (image) data. MPEG saves bandwidth by transmitting a first frame and then only transmitting the differences in subsequent frames, rather than transmitting a separate image for each frame. Therefore, all computers systems implementing the MPEG standard necessarily have facilities for quickly determining the differences between two or more frames of image data.

Accordingly, the present invention treats the two images generated from the profile data as MPEG frames. The MPEG algorithm is performed on the frames. Then, the resulting frame difference information is used to determine whether the application's profile is stabilizing. If the profile is stabilizing, then the profiler can take less frequent profile bursts. If the profile is not stabilizing, on the other hand, then the profiler can take more frequent profile bursts.

A technical advantage of the present invention is that a profiler can quickly obtain information on whether an application's profile is stabilizing.

Another technical advantage of the present invention is that the profiler can utilize preexisting image processing capabilities to analyze the profile data.

Yet another technical advantage of the present invention is that an application can be profiled quickly and efficiently.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 3:
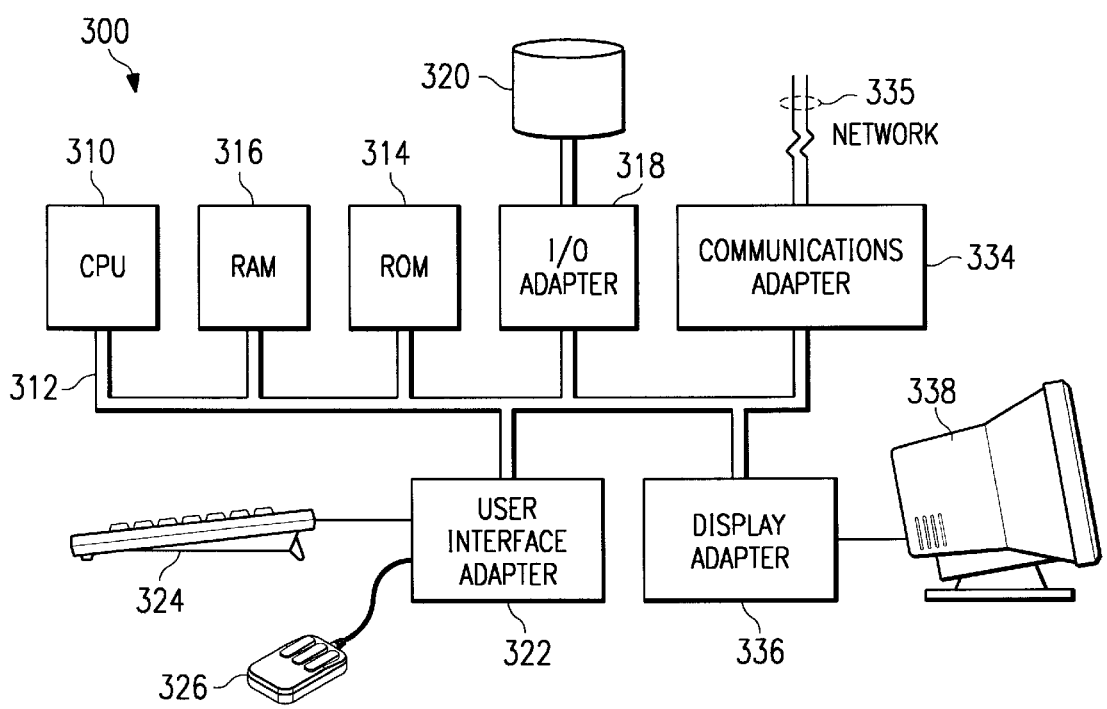
FIG. 3 is a block diagram of a computer system adapted to execute the present invention.

FIG. 3 illustrates a computer system 300 adapted to execute the present invention. Central processing unit (CPU) 310 is coupled to bus 312. In addition, bus 312 is coupled to random access memory (RAM) 316, read only memory (ROM) 314, input/output (I/O) adapter 318, communications adapter 334, user interface adapter 322, and display adapter 336.

CPU 310 may be any general purpose CPU, such as a HP PA-8000. In addition, CPU 310 preferably supports image processing instructions, such as matrix math instructions. However, the present invention is not restricted by the architecture of CPU 310 as long as CPU 310 or other hardware or software within computer system 300 supports the image processing operations described below.

RAM 316 and ROM 314 hold user and system data and programs as is well known in the art. I/O adapter 318 connects storage devices, such as hard drive 320, to the computer system. Communications adaption 334 is adapted to couple the computer system to local or wide-area network 335. User interface adapter 322 couples user input devices, such as keyboard 324 and pointing device 326, to the computer system. Finally, display adapter 336 is driven by CPU 310 to control the display on display device 338. Note that display adapter 336 may contain specialized hardware designed to accelerate image processing. The term "operating system" (OS) refers to a computer program that executes on and controls computer system 300. A preferred embodiment of the present invention uses the HP-UX OS, although it could easily be adapted to execute on other variants of *NIX or different OS's.

As used herein, "burst profiler" refers to a computer program for profiling a second computer program, or application. A preferred embodiment of a burst profiler is described in application Ser. No. 08/719,854 entitled METHOD AND SYSTEM OF BURST PROFILING USING DYNAMIC RECOMPILATION, which is hereby incorporated by reference.

In short, a burst profiler executes a native application free and unfettered for a first time interval. Then, the burst profiler utilizes a dynamic translation system (DTS) to instrument the application with profiling code. The instrumented application is executed beginning at the state at which the native application was stopped. The instrumented application generates profile data until the expiration of a second time period. Then, the native application is again executed beginning at the state at which the instrumented application was stopped. This profiling process repeats and gathers bursts of profile data until either the application finishes execution or the application's profile stabilizes.

The application's profile stabilizes when further profiling will not yield significant additional data about the behavior of the application. The present invention is a way to analyze the profile data to determine whether the application's profile is stabilizing. Thus, the present invention is intended to be used in cooperation with a burst profiler in order to control the frequency and duration of the bursts.

Figure 1:
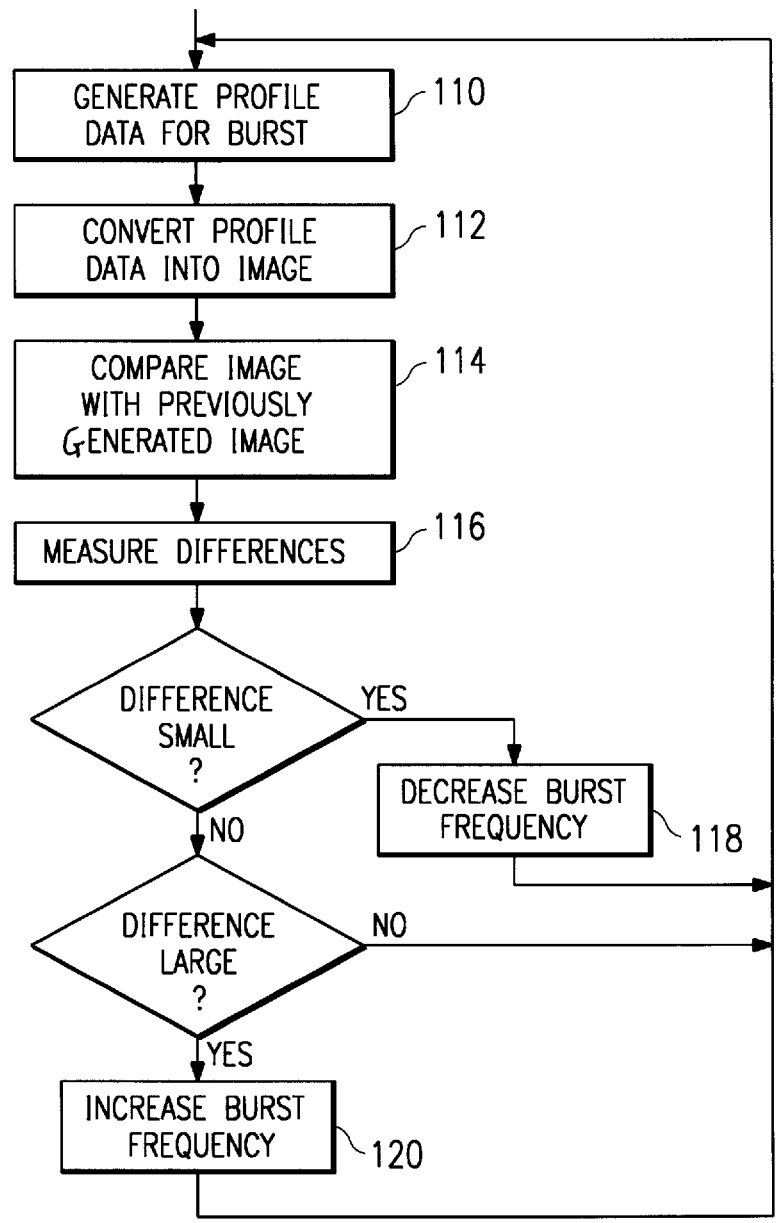
FIG. 1 is a flow chart describing the process by which image processing techniques are used to control the frequency of a burst profiler.

FIG. 1 is a flow chart describing the process by which image processing techniques are used to control the frequency of the burst profiler. At step 110, the profiler generates profile data for a particular burst of the instrumented application. This data is saved in computer system 300. In addition, the data is added to previously collected profile data and the sum is saved in computer system 300 for later analysis.

Figure 2:
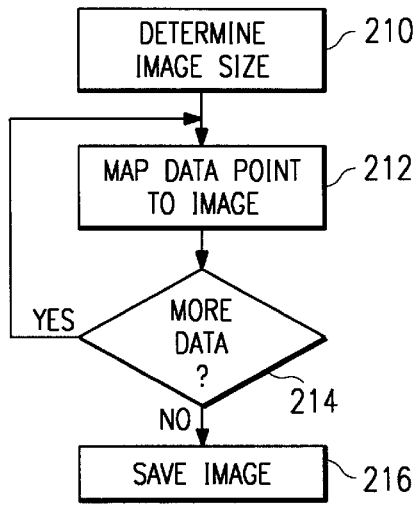
FIG. 2 is a flow chart describing the process by which a burst of profile data is converted into an image.

At step 112, the profile data is converted into image data. FIG. 2 is a flow chart describing the process by which a single burst of profile data is converted into an image. Before discussing FIG. 2 in detail, it is important to note that there are many ways to convert profile data into image data.

The conversion technique depends on the type of data collected by the profiler. Typical profile data attributes include: instruction addresses, execution frequencies, and number of times branches were taken. Possible image attributes include: pixel coordinates and color.

Assume, for example, that the profiler collects execution frequencies for every instruction in the application. The profile data, therefore, has two data points for each datum: the address of the instruction and the number of times the instruction was executed. This data can be mapped to image data by placing the instruction address on a first axis and the frequency of execution on a second axis.

Other types of mappings are possible for data having two or more data points. Each pixel in an image, for example, typically contains 8 bits each of red, green, and blue color information. These 24 bits can be used, separately or together, to represent profile data points. Similarly, the image can have three or more dimensions, with each dimension axis representing data points. Such mappings and attributes can vary depending on specific profiling needs. The only requirement is that identical mappings be used for all bursts of profile data in a particular profiling run.

Turning to FIG. 2, at step 210, the size and color depth of the image is established. Obviously, the more profile data, the larger or deeper the image must be in order to represent the data. At step 212, the profiler maps a profile data point to a particular attribute of the image. At step 214, the profiler determines whether more profile data points need to be mapped to image attributes. Steps 212 and 214 repeat until all profile data points have been mapped. Then, at step 216, the image is saved in computer system 300.

Returning to FIG. 1, at step 114 the newly generated frame of image data is compared with a frame generated from a previous profiling burst. Since the bursts of profiling data have been converted to frames of image data, image processing algorithms and multimedia support built into computer system 300 can perform step 114 very quickly.

A preferred embodiment of the present invention uses hardware and software for implementing the Moving Pictures Experts Group (MPEG) standard to compare the images. This standard was design to transmit moving pictures while using relatively low bandwidth. The MPEG standard conserves bandwidth by transmitting a starting frame and then only transmitting the differences of subsequent frames. Therefore, a computer system that implements the MPEG standard necessarily has the ability to quickly convert a series of frames into the starting frame plus differences format. This ability is applied to the images created from the profile data to quickly measure the differences between the images.

At step 116, this difference information is measured to determine whether the difference is small or large. Whether a particular difference value is small or large depends upon the particular needs of the profiler.

If the difference is small, then the profile has probably begun to stabilize or has already stabilized. Therefore, at step 118, the profiling frequency is decreased. That is, the profiler takes fewer and/or shorter profile bursts of the application.

If the difference is large, however, then the application profile is changing rapidly. Accordingly, at step 120, the profiling frequency is increased. If the difference is neither large nor small, then the profiling frequency is left the same. Once the profiling frequency has been adjusted, the profiler returns to step 110 and repeats the process.

Although the present invention and its advantages have been described in detail, it should be understood that various changes, substitutions and alterations can be made herein without departing from the spirit and scope of the invention as defined by the appended claims.

What is claimed is:

1. A method of controlling a burst frequency of a burst profiler executing on a computer system, the method comprising the steps of:

representing data from a first profile burst as a first image;

measuring, on the computer system, a difference between the first image and a second image; and adjusting the burst frequency in response to the difference.

2. The method of claim 1, further comprising the step of:

representing data from a second profile burst as the second image, wherein the second profile burst occurs subsequent to the first profile burst.

3. The method of claim 1, wherein the data comprise a plurality of data points and the representing step comprises the step of:

mapping the plurality of data points to a plurality of image characteristics.

4. The method of claim 1, wherein the measuring step comprises the step of:

performing, by the computer system, an image processing routine on the first and second images, wherein the computer system is optimized to perform the image processing routine.

5. The method of claim 4, wherein the image processing routine is an MPEG routine.

6. The method of claim 1, wherein the adjusting step comprises the steps of:

if the difference is small, decreasing the burst frequency; and if the difference is large, increasing the burst frequency.

7. The method of claim 1, further comprising the step of:

adjusting a burst duration in response to the difference.

8. A computer program product for controlling a data collection frequency of a burst profiler executing on a computer system, the computer program product comprising:

a computer usable medium having computer program logic recorded thereon, the computer program logic comprising:

means for transforming a first data set into a first image and a second data set into a second image;

means for ascertaining differences between the first and second images; and means for adjusting the data collection frequency in response to the differences.

9. The computer program product of claim 8, wherein the first and second data sets are generated from respective first and second bursts of the burst profiler.

10. The computer program product of claim 8, wherein the means for transforming comprise:

means for determining a size of the image from a size of the first and second data sets;

means for mapping data in the first data set to particular image characteristics of the first image; and means for mapping data in the second data set to particular image characteristics of the second image, wherein the first and second mappings are the same.

11. The computer program product of claim 10, wherein the particular image characteristics include:

a coordinate location within the image; and a color of the image.

12. The computer program product of claim 10, wherein the means for determining the size comprise:

means for determining a color depth of the image from the size of the first and second data sets.

13. The computer program product of claim 8, wherein the computer system includes an image processing system and wherein the means for ascertaining comprise:

means for utilizing the image processing system to compare the first and second images.

14. The computer program product of claim 13, wherein the image processing system implements a MPEG standard.

15. The computer program product of claim 8, wherein the means for adjusting comprise:

means for decreasing the data collection frequency if the differences are small; and means for increasing the data collection frequency if the differences are large.

16. A burst profiler for profiling an application executing on a computer system, the burst profiler comprising:

means for representing data collected from a first profile burst of the application as a first image;

means, executing on the computer system, for comparing the first image with a second image to produce difference information; and means for regulating a burst frequency of the burst profiler in response to the difference information.

17. The burst profiler of claim 16, further comprising:

means for representing data from a second profile burst as the second image.

18. The burst profiler of claim 16, wherein the data comprise a plurality of data points and the means for representing comprise:

means for mapping the plurality of data points to a plurality of image characteristics.

19. The burst profiler of claim 16, wherein the means for comparing comprise:

means, executing on the computer system, for performing an image processing routine on the first and second images, wherein the computer system is optimized to perform the image processing routine.

20. The burst profiler of claim 16, wherein the means for regulating comprise:

means for decreasing the burst frequency if the difference information indicates a small difference;

means for increasing the burst frequency if the difference information indicates a large difference.

* * * * *